Oct. 1, 1968 K. D. RUPPERT 3,404,311

INDICATOR LAMP CIRCUITRY FOR A RECORDER

Filed Jan. 3, 1966

INVENTOR
KEITH D. RUPPERT

BY Thomas A. Briody
ATTORNEY

United States Patent Office 3,404,311

Patented Oct. 1, 1968

3,404,311

INDICATOR LAMP CIRCUITRY FOR A RECORDER

Keith D. Ruppert, Decatur, Ill., assignor to General Electric Company, a corporation of New York Filed Jan. 3, 1966, Ser. No. 518,069
4 Claims. (Cl. 315—172)

This invention relates to circuitry for controlling an indicator light in response to two DC signals, and more particularly to a circuit finding particular utility in recorders, such as tape recorders, for providing a steady light from a lamp indicator while the recorder is in the playback mode and a blinking light when the tape recorder is in the record mode.

Conventional tape recorders which may find broad general utility have specific utility in the field of monaural and stereo devices. For instance, a tape recorder can be used to tape a stereo broadcast when it is in the record mode for playback later when the recorder is in the playback mode. It is extremely important in such an environment that the recorder not be in the playback mode when recording is being done, and vice versa. The circuit in accordance with the present invention provides one type of indication when the recorder is in the record mode and another type when the recorder is in the playback mode so that operator mistake is greatly minimized. In the record mode the indicator is provided by a blinking light and in the playback mode by a steady light.

It is therefore one object of the present invention to provide circuitry for controlling an indicator light in association with recording devices whereby operator confusion between the record mode and the playback mode of the recorder is minimized.

The above and other objects will become apparent from a more detailed description of the accompanying drawings.

Figure 1:
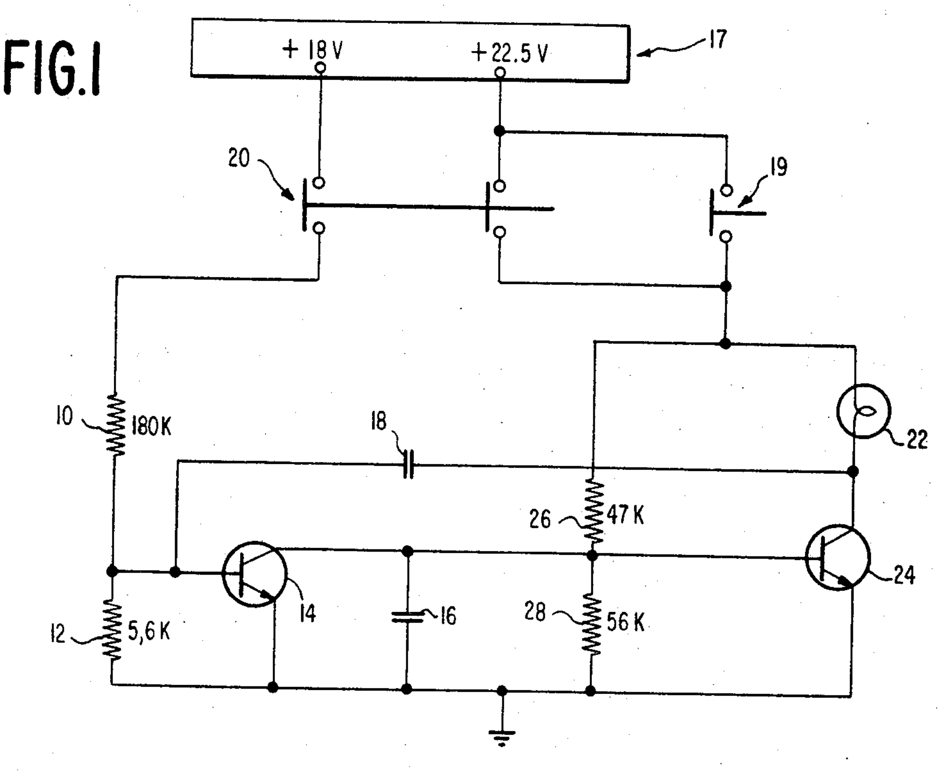
FIGURE 1 is a circuit diagram of one form of the present invention.

Referring to the figures, the power supply is indicated by numeral 17. It should be noted here that the power supply is only shown diagrammatically and provides two voltage sources, namely a collector voltage source of 22.5 volts and base bias voltage source of 18 volts. The voltage sources of power supply 17 are representative only, and other suitable voltage sources may also be utilized within the framework of the present invention. It may be that when either the record button 20 or the playback button 19 is pushed, the idler wheel solenoid associated with the recorder is activated. This will provide the 22.5 volts DC. When the playback button is pushed, only the 22.5 voltage is supplied, but when the record button is pushed, the 22.5 volts as well as the 18 volts are supplied. The latter may be supplied through the medium of the record pre-amplifiers being energized.

Figure 2:
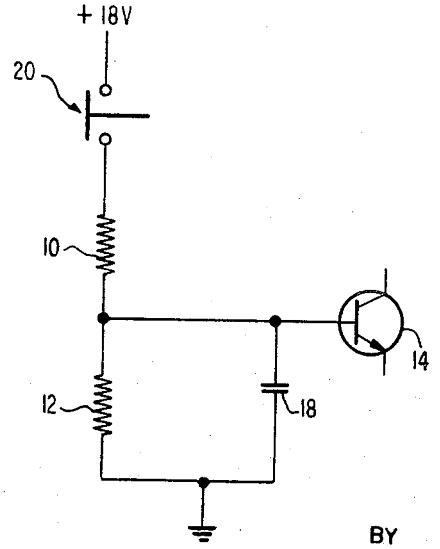
FIGURE 2 is an equivalent circuit showing a part of the circuit of FIGURE 1 when the recorder is in the playback mode.

When the playback button 19 is pushed so as to connect the +22.5 volts to the circuit, current flows from the power supply 17 down through the lamp 22 and the NPN transistor 24 to ground. The lamp then gives off a steady light. The bias for the base of transistor 24 is provided by the voltage divider including the 47K ohm resistor 26 and the 56K ohm resistor 28. (Note that transistor 24 functions as a grounded-emitter stage with the 22.5 volts providing collector voltage thereto.) As long as switch 19 remains closed, a heavy current flows through the lamp 22 and the heavily conducting transistor 24. Since the collector of transistor 24 is near ground at this time, the base circuit of transistor 14 appears as indicated in FIGURE 2. It is noted in FIGURE 2 that capacitor 18 is then effectively connected between the base of transistor 14 and ground. Since at this time the record switch 20 is open, transistor 14 is non-conducting. It can be seen then that in the playback mode the lamp 22 gives off a steady light.

In the record mode the record button 20 is depressed and the button 19 is automatically opened thereby. It should be noted that mechanical means may be provided so that only one of the two buttons is closed at any particular time.

With the record button 20 depressed, 22.5 volts is again provided to the circuit as before. The 22.5 voltage is also supplied to the collector of NPN transistor 14 through the medium of the voltage divider 26–28. The collector of 14 is directly connected to the base of 24, and like 24 transistor 14 functions as a grounded-emitter stage. Also, 18 volts is supplied across the voltage divider including the 180K ohm resistor 10 and the 5.6K ohm resistor 12. The base of transistor 14 obtains its bias from this divider as shown. Assuming that transistor 24 is initially conducting providing light from lamp 22, capacitor 18, connected between the base of 14 and collector of 24, begins charging positively on the base side of transistor 14. When the capacitor becomes sufficiently positive, transistor 14 is turned on, causing capacitor 16, connected between ground and the collector of 14 and base of 24, to discharge, thereby lowering the voltage on the base of transistor 24. Transistor 24 in turn cuts off, raising its collector voltage to a high level which is also coupled through capacitor 18 to the base of transistor 14. When transistor 24 turns off, lamp 22 also turns off and this condition will be maintained as long as transistor 14 is conducting.

The high positive voltage on the base side of capacitor 18 begins to decay as capacitor 18 discharges until such time as it drops below the value necessary to maintain transistor 14 conducting. At that time, transistor 14 turns off and capacitor 16 begins charging positively, causing transistor 24 to turn on, which in turn lowers its collector voltage to near zero and allows a heavy current to pass through the lamp 22. This latter condition will be maintained until the base side of capacitor 18 again charges to a high enough positive value to turn on transistor 14. When the latter occurs the cycle is repeated. It can be seen then that during the record mode the lamp 22 is turned on and off slowly to provide a blinking light. A convenient frequency may be 20 c.p.m.

It can be seen then that the circuit operates in the record mode as a multivibrator and the lamp generates a blinking light at the frequency of operation of the multivibrator. In the playback mode only one of the two transistors in the multivibrator circuit is energized, namely that one having the lamp in its collector circuit.

The circuit has been shown with representative values of resistors and using NPN transistors. Other representative values of components can be used including the use of PNP transistors provided, in the latter event, proper changes are made to the polarity of the supply voltages. As to the capacitors 16 and 18 they may respectively have the values of 25 mfd. and 10 mfd.

What has been disclosed is one form of the present invention. Other forms are obvious from the teachings therein to those skilled in the art and it is contemplated to be within the spirit and scope of the following claims.

What is claimed is:

1. A circuit for selectively indicating playback mode and record mode operation in a recorder that comprises a lamp and first means to cause said lamp to generate a steady light indicating one mode of operation and second means to cause said lamp to generate a blinking light indicating the other mode of operation, said first means including:

(1) a first transistor having collector, base and emitter electrodes, (2) a first source of voltage for said first transistor, (3) means connecting said lamp and said first transistor in series for DC, (4) a first switch means for connecting said first source in series with (3), whereby upon operation of (4) said lamp generates a steady light, and said second means including:

(1), (2) and (3), and (5) a second transistor having collector, base and emitter electrodes, (6) a second source of voltage for said second transistor, (7) means connecting the collector of the second transistor to the base of the first transistor, (8) a first capacitor connected across the emitter-collector of the second transistor, (9) a second capacitor connected between the base of the second transistor and the collector of the first transistor, and

(10) a second switch means for connecting said first source in series with (3) and for connecting said second source to the base of the second transistor, whereby upon operation of (10) said lamp generates a blinking light.

2. A circuit as defined by claim 1 further including a resistive means connected across said lamp and said first transistor and means connecting the base of said first transistor to said resistive means.

3. A circuit as defined by claim 2 further including a voltage divider, means connecting said second source of voltage to said divider and means connecting said divider to the base of said second transistor.

4. A circuit as defined by claim 3 wherein the collector of said second transistor is directly connected to the base of said first transistor.

References Cited

UNITED STATES PATENTS 3,284,083 11/1966 Levin et al. --------- 273—138

JOHN W. HUCKERT, *Primary Examiner.*

J. R. SHEWMAKER, *Assistant Examiner.*